United States Patent [19]

Steere

[11] Patent Number: 4,716,881
[45] Date of Patent: Jan. 5, 1988

[54] BLADE MOUNT FOR INNER DIAMETER SAW BLADE

[75] Inventor: Robert E. Steere, Parsippany, N.J.

[73] Assignee: Silicon Technology Corporation, Oakland, N.J.

[21] Appl. No.: 913,966

[22] Filed: Oct. 1, 1986

[51] Int. Cl.$^4$ .............................................. B28D 1/04
[52] U.S. Cl. ....................................... 125/15; 51/73 R
[58] Field of Search ........................ 125/15, 18, 13 R; 51/206 R, 207, 209 R, 73 R

[56] References Cited

U.S. PATENT DOCUMENTS

| | | | |
|---|---|---|---|
| 3,329,138 | 7/1967 | Lupardo | 125/15 |
| 4,498,449 | 2/1985 | Kachajian | 125/15 |
| 4,637,369 | 1/1987 | Petermann | 125/15 |

FOREIGN PATENT DOCUMENTS 1162912  9/1969  United Kingdom ............... 125/15

Primary Examiner—Harold D. Whitehead
Attorney, Agent, or Firm—Kenyon & Kenyon

[57] ABSTRACT

The saw blade mount is provided with a stabilizer blade mount for imposing an axial force on the saw blade to eliminate unevenness in the saw blade. The stabilizer blade mount includes a gasket ring of plastic or elastomeric material which is abutting against the saw blade and which faces an opposing surface of an inner clamping ring. Adjustment screws permit adjustment of the stabilizing ring relative to the saw blade either completely about the periphery or only at localized regions.

20 Claims, 3 Drawing Figures

BLADE MOUNT FOR INNER DIAMETER SAW BLADE

This invention relates to a blade mount for an inner diameter saw blade.

As is known, inner diameter saw blades have been used for the slicing of thin wafers from cylindrical ingots, for example of silicon material. Generally, the thin wafers which are obtained are used in the semi-conductor industry for the manufacture of semi-conductor chips having intergrated circuits thereon.

In order to provide for an economical slicing of the thin wafers, various types of tensioning means have been provided for tensioning the blades so that the cutting surface has a suitable rigidity and concentricity to produce uniform results. One known tensioning device is described in U.S. Pat. No. 4,498,449. In this regard, use is made of an adjustable tensioning ring in order to engage and deform a blade which has been previously clamped between a pair of clamping rings. Generally, this tensioning device provides satisfactory results.

However, it has been found in some cases that there is an occasional bending or cupping of the complete blade mount as a result of unevenness in the total blade tensioning force. That is, the unevenness of the tensioning force causes the whole blade mount to bend out of true flatness. As a result, the plane of the blade follows suit. This, in turn, is detrimental to the slicing of wafers from an ingot. For example, the bending of the blade may cause core rubbing and excessive kerf loss.

Accordingly, it is an object of the invention to maintain an inner diameter saw blade truly flat during a slicing operation.

It is another object of the invention to be able to adjust for unevenness in the tensioning force imposed on an inner diameter saw blade by a blade mount.

It is another object of the invention to avoid unevenness in the mounting of an inner diameter saw blade.

It is another object of the invention to increase the efficiency of an inner diameter saw blade in the slicing of thin wafers.

Briefly, the invention provides a blade mount for an inner diameter saw blade which is comprised of a pair of clamping rings for securing the saw blade therebetween, means disposed within one of the clamping rings for tensioning the saw blade and a stabilizer blade mount secured to one of the clamping rings for imposing an axial force on the saw blade.

The means for tensioning the saw blade may be of any suitable construction, for example, as described in U.S. Pat. No. 4,498,449. In this case, the tensioning means includes a tensioning ring within one of the clamping rings and an annular row of adjustment screws for adjusting the tensioning ring relative to the clamping ring and, thus, adjusting the tensioning force on the blade peripherally of the clamping rings.

The stabilizer blade mount includes a ring, for example, a gasket seal ring, for abutting a saw blade mounted between the clamping rings. In this regard, the gasket seal ring faces a flat portion of the adjacent clamping ring and is made of plastic or an elastomeric material.

The stabliizer blade mount also includes a stabilizer ring on which the gasket ring is mounted via an axially projecting portion as well as an annular row of adjustment screws which secure the stabilizer ring to a clamping ring. By tightening the adjustment screws sequentially, the stabilizer ring and, thus, the gasket seal ring can be moved axially relative to the blade so that the blade itself is moved slightly in the axial direction, for example by bulging the gasket ring past the plane of the adjacent clamping ring into an open area radially within the clamping ring. In this way, a fine adjustment can be made by the adjustment screws in order to make the plane of the saw blade truly flat. Further, where the gasket seal ring is made of elastomeric material, the ring serves to seal out contaminants from entering the inner recess. Also, where elastomeric, the gasket serves to dampen blade vibration.

The blade mount may also be provided with a second annular row of adjustment screws which are threaded into the clamping ring for abutting and adjustably spacing the stabilizing ring from this clamping ring. This second row of adjustment screws may serve two purposes. First, the screws provide a means of limiting the amount of squeeze against the gasket seal ring at any particular point about the periphery, even to the extent of reducing overly deflected portions of the saw blade allowing the blade to move in reverse, if required, while adjacent points can be squeezed further. Second, the second row of adjustment screws provide a means of lightly locking one annular row of screws against the other to prevent loosening and turning and, in turn, losing position during operation.

A suitable seal ring may also be provided between the stabilizing ring and the clamping rings to seal out dust and dirt.

These and other objects and advantages of the invention will become more apparent from the following detailed description taken in conjunction with the accompanying drawings wherein.

Figure 1:
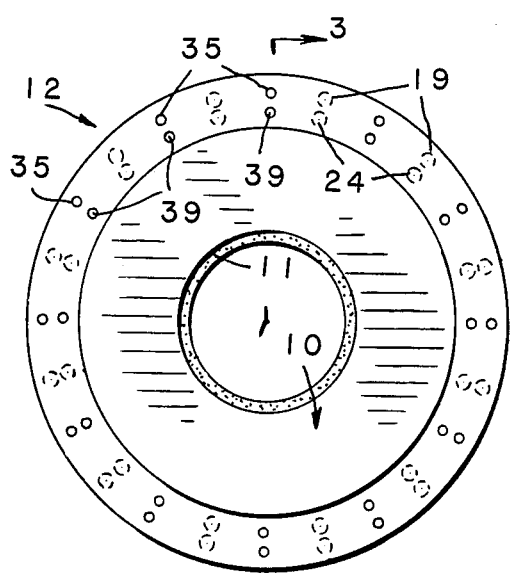
FIG. 1 illustrates a front view of a blade mount having an inner diameter saw blade mounted therein.
Figure 2:
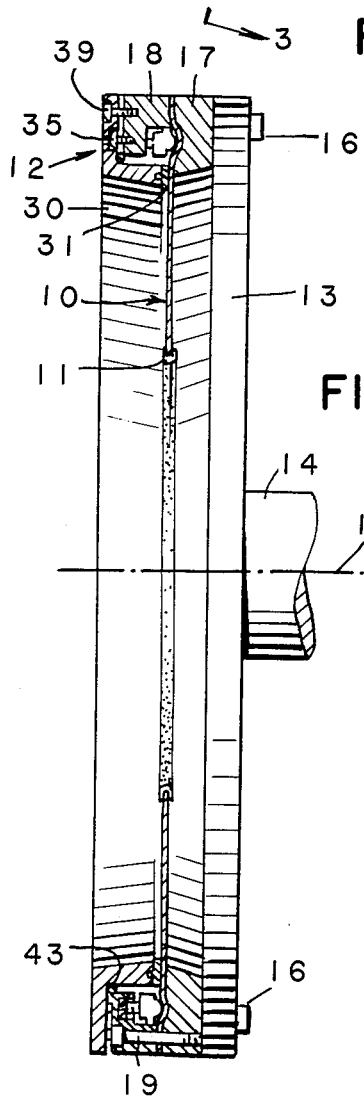
FIG. 2 illustrates a partial sectional view of a blade mount on a wheel head of a slicing machine.

Referring to FIGS. 1 and 2, an inner diameter saw blade 10 having an inner peripheral cutting edge 11 is mounted within a blade mount 12 which, in turn, is mounted on a wheel head 13 of a slicing machine (not shown). As indicated in FIG. 2, the wheel head 13 is secured to a drive shaft 14 so as to be rotated about a longitudinal axis 15 of the shaft 14. In addition, a plurality of mounting bolts 16 are disposed about the periphery of the wheel head 13 in order to secure the blade mount 12 thereon.

Figure 3:
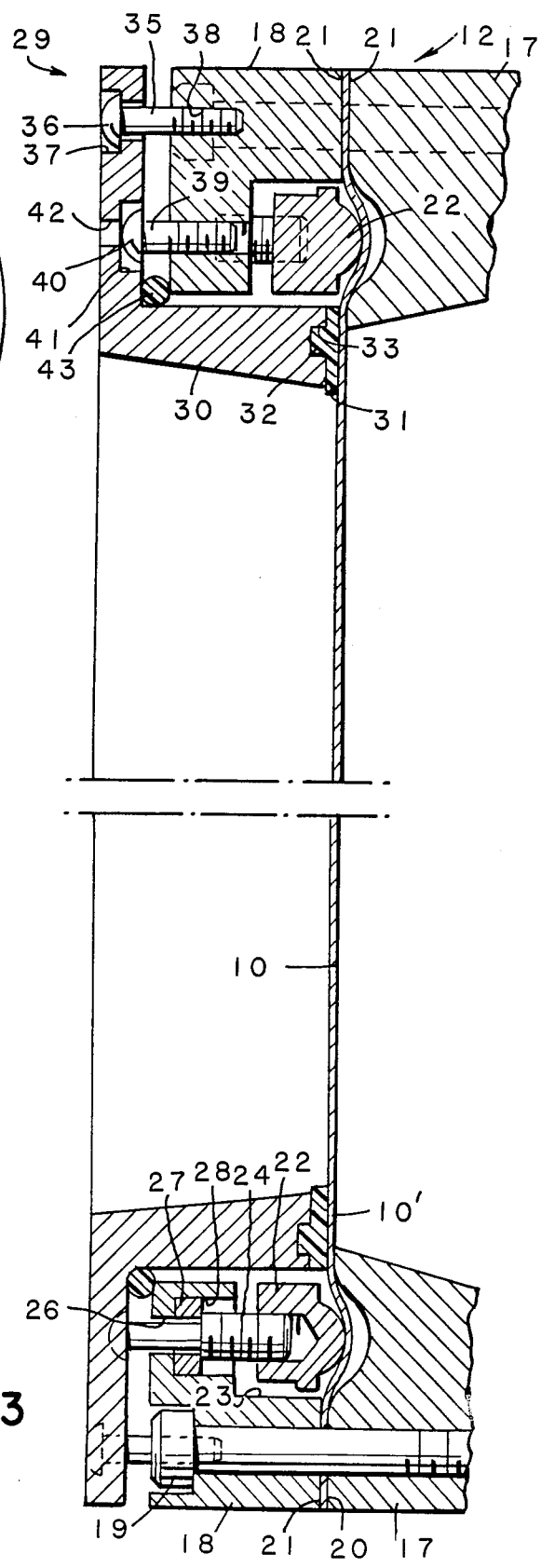
FIG. 3 illustrates a cross sectional view of a blade mount constructed in accordance with the invention.

Referring to FIG. 3, the blade mount 12 includes a pair of clamping rings 17, 18 for securing the saw blade 10 therebetween in known manner. As indicated, a plurality of peripherally disposed mounting bolts 19 pass through the outer clamping ring 18 through suitable apertures in the blade 10 and into threaded bores 20 of the inner clamping ring 17. As indicated, the inner clamping ring 17 has an inner annular portion spaced inwardly from the outer clamping ring 18 which forms a flat surface 21 for purposes as described below.

The blade mount also includes a means disposed within the outer clamping ring 18 for tensioning the saw blade 10. This means includes a male tensioning ring 22 disposed within a recess 23 of the outer clamping ring 18 and annular row of adjustment screws 24 which serve to adjust the tensioning ring 22 relative to the clamping ring 18. As indicated, the male tensioning ring 22 has a rounded portion which faces a recess 25 within the opposite clamping ring 17 and which serves to abut and deflect the saw blade 10 into the recess 25. In addition, each adjusting screw 24 is provided with a suitable socket, for receiving a socket wrench (not shown) and which is aligned with an aperture 26 in the clamping ring 18 through which a wrench may be passed for adjustment purposes. A suitable bearing bushing 27 is also disposed between each adjustment screw 24 and the clamping ring 18 in alignment with the aperture 24 to facilitate turning of the adjustment screw 24. Each adjustment screw 24 is also disposed within a suitable circular recess 28 in the clamping ring 18.

The construction and operation of the tensioning means is similar to that as described in U.S. Pat. No. 4,498,449 and need not be further described.

The blade mount 12 also includes a stablizer blade mount 29 which is secured to the outer clamping ring 18 for imposing an axial force on the saw blade 10. This stabilizer blade mount 29 includes a stabilizer ring 30, for example of L-shaped cross section, and a gasket seal ring 31 which is mounted on the stabilizer ring 30 for abutting the saw blade 10. As indicated, the gasket seal ring 31 faces the flat surface 21 of the clamping ring 17 and has an axially projecting portion 32 which is received within an annular groove 33 of the stabilizer ring 30. As indicated, the gasket seal ring 31 has a smaller inside diameter than the clamping ring 17 such that only an outer radial portion of the gasket seal ring 31 faces the clamping ring surface 21.

The gasket seal ring 31 is made of any suitable material such as a plastic material or an elastomeric material. When made of an elastomeric material, the gasket ring 31 acts as a seal against the passage of dirt and sludge while also damping blade vibration.

The stabilizer ring 30 is mounted via an annular row of adjustment screws 35 on the clamping ring 18. As indicated, each adjustment screw 35 has a head 36 which is recessed within a suitable circular recess 37 in the stabilizer ring 30 while being threaded at least partially into a threaded bore 38 in the clamping ring 18. In addition, a second annular row of adjustment screws 39 are threaded into the clamping ring 18 and have heads 40 which abut the stabilizer ring 30 within respective recesses 41. Suitable apertures 42 also pass through the stabilizer ring 30 to permit a tool such as a socket wrench to pass through the stabilizer ring 30 to permit adjustment of each screw 39.

The two annular rows of adjustment screws 35, 39 are aligned so that each pair of screws 35, 39 are in the same radial plane as indicated in FIG. 1. At the same time, the adjustment screws 35, 39 are angularly spaced from the adjustment screws 24 of the tensioning means and the mounting bolts 19 for the clamping rings 17, 18.

As indicated in FIG. 3, a seal ring, such as an O-ring seal 43 is disposed between the clamping ring 18 and the stabilizing ring 30 to seal the gap existing therebetween.

In order to mount a blade 10 in place, the blade 10 is first disposed between the clamping rings 17, 18 and the mounting bolts 19 are threaded in place to secure the blade 10 and clamping rings 17, 18 together. Thereafter, the adjustment screws 24 can be adjusted through the apertures 26 so that the tensioning ring 22 is moved axially to tension the saw blade 10 in known manner.

After the blade 10 has been tensioned, if not previously threaded in place, the adjustment screws 39 are threaded into the clamping ring 18. Thereafter, the stabilizing ring 30 with the gasket seal ring 31 and O-ring seal 43 in place is fitted within the clamping ring 18 so that the gasket seal ring 31 abuts the saw blade 10. All the adjustment screws 35 are then passed through the stabilizing ring 30 and threaded into the clamping ring 18.

Initially, the stabilizing ring 30 simply sits the gasket seal ring 31 against the tensioned saw blade 10. If the saw blade 10 is not truly flat at the periphery 10' as indicated by a precision deviation indicator, for example, or if an unevenness occurs in the saw blade peripherally 10' as a result of the prior blade tensioning process, one or more of the adjustment screws 35 is threaded further into the clamping ring 18 to move the stabilizing ring 30 inwardly against the saw blade 10 in the region of the blade 10 associated with the maximum unevenness toward the stabilizing ring side. In this regard, the entire stabilizing ring 30 need not be moved axially. Instead, only those certain regions of the stabilizing ring 30 may be moved axially to even out any blade deviations from true flatness. The whole blade mount 12 is rotated past the point of contact of the precision deviation indicator during this operation.

The inner adjustment screws 39 serve to adjustably space the stabilizing ring 30 from the clamping ring 18 in a counterforce manner to the outer adjusting screws 35 as a means for limiting the squeeze of the gasket seal ring 31 at any particular point around the periphery of the saw blade 10.

Once the outer adjustment screws 35 are in final adjusted position and the inner adjusting screws 39 are in final adjusted position, the inner screws 39 can be threaded out into slightly further abutment with the stabilizing ring 30. Thus, the inner adjusting screws 29 may serve to lightly lock the screws 35, 39 relative to each other to prevent loosening during operation.

Referring to FIG. 3, when the gasket seal ring 31 has been moved axially against the saw blade 10, the saw blade 10 bulges about the radial inner projecting corner of the clamping ring 17.

The invention thus provides a blade mount which can be adjusted from time-to-time to eliminate unevenness which is known as axial blade flutter in a saw blade. To this end, the adjustment of the stabilizing ring 30 can be made from time-to-time to compensate for any bending or cupping of the clamping rings caused during operation of the slicing machine. Further, localized adjustments can be made to even out the saw blade 10 into a truly flat plane.

The invention also provides a stabilizer blade mount which can be fitted onto existing saw blade tensioning devices with a minimum of change in the tensioning device.

What is claimed is:

1. A blade mount for an inner diameter saw blade comprising
 a pair of clamping rings for securing an inner diameter saw blade therebetween;
 means disposed within one of said clamping rings for tensioning the saw blade; and
 a stabilizer blade mount adjustably secured to one of said clamping rings for imposing an axial force on the saw blade.

2. A blade mount as set forth in claim 1 wherein said means includes a tensioning ring within said one clamping ring and an annular row of adjustment screws for adjusting said tensioning ring relative to said one clamping ring.

3. A blade mount as set forth in claim 1 wherein said stabilizer blade mount includes a ring for abutting a saw blade mounted between said clamping rings radially inwardly of said clamping rings.

4. A blade mount as set forth in claim 3 wherein said other of said clamping rings includes a flat surface facing said ring of said stabilizer blade mount and said latter ring has a smaller inside diameter than said flat surface.

5. A blade mount for an inner diameter saw blade comprising
a pair of clamping rings for securing an inner diameter saw blade therebetween;
means disposed within one of said clamping rings for tensioning the saw blade; and
a stabilizer blade mount secured to one of said clamping rings for imposing an axial force on the saw blade, said stabilizer blade mount including a stabilizer ring adjustably mounted on said one clamping ring for movement axially of said clamping rings and a gasket seal ring mounted on said stabilizer ring for abutting a saw blade mounted between said clamping rings.

6. A blade mount as set forth in claim 5 wherein the other of said clamping rings includes a flat surface facing said gasket seal ring.

7. A blade mount as set forth in claim 6 wherein said gasket seal ring has an axially projecting portion received in said stabilizer ring.

8. A blade mount as set forth in claim 7 wherein said gasket seal ring is made of elastomeric material.

9. A blade mount as set forth in claim 5 which further comprises a seal ring between said stabilizer ring and said one clamping ring.

10. A blade mount as set forth in claim 5 which further comprises a first annular row of adjustment screws securing said stabilizer ring to said one clamping ring.

11. A blade mount as set forth in claim 10 which further comprises a second annular row of adjustment screws in said one clamping ring for abutting and adjustably spacing said stabilizing ring from said one clamping ring.

12. A blade mount for an inner diameter saw blade comprising
a pair of clamping rings for securing an inner diameter saw blade therebetween;
means within one of said clamping rings for tensioning the saw blade, said means including a tensioning ring within said one clamping ring an annular row of adjustment screws for adjusting said tensioning ring relative to said one clamping ring; and
a stabilizer blade mount secured to one of said clamping rings for imposing an axial force on the saw blade, said stabilizer blade mount including a stabilizer ring adjustably mounted on said one clamping ring and a gasket seal ring mounted on said stabilizer ring concentrically within said tensioning ring for abutting a saw blade mounted between said clamping rings.

13. A blade mount as set forth in 12 wherein the other of said clamping rings includes a surface facing said gasket seal ring and said gasket ring has a smaller inside diameter than said surface.

14. A blade mount as set forth in claim 13 wherein said gasket ring has an axially projecting portion mounted in said other clamping ring.

15. In combination
an inner diameter saw blade;
a pair of clamping rings having said blade secured therebetween;
a tensioning ring adjustably mounted within one of said clamping rings for tensioning said blade; and
a stabilizer blade mount adjustably secured to said one clamping ring and including a fourth ring concentrically within said tensioning ring for imposing an axial force on said blade.

16. The combination as set forth in claim 15 wherein the other of said clamping ring includes a surface facing said fourth ring and said fourth ring has a smaller inside diameter than said other ring.

17. The combination as set forth in claim 16 wherein said fourth ring is made of an elastomeric material.

18. The combination as set forth in claim 16 wherein said stabilizer blade mount includes a stabilizer ring having said fourth ring mounted thereon and a first annular row of adjustment screw adjustably securing said stabilizer ring to said one clamping ring axially of said one clamping ring.

19. The combination as set forth in claim 18 which further comprises a second annular row of adjustment screws in said one clamping ring for abutting and adjustably spacing said stabilizing ring from said one clamping ring.

20. The combination as set forth in claim 18 which further comprises a seal ring between said stabilizer ring and said one clamping ring.

* * * * *

UNITED STATES PATENT AND TRADEMARK OFFICE
CERTIFICATE OF CORRECTION

PATENT NO. : 4,716,881

DATED : January 5, 1988

INVENTOR(S) : ROBERT E. STEERE

It is certified that error appears in the above-identified patent and that said Letters Patent is hereby corrected as shown below:

```
Column 1, line 12 "integrated" should be -integrated-
Column 1, line 64 "stabliizer" should be -stabilizer-
Column 5, line 48 "ring an" should be -ring, an-
Column 6, line 29 "ring" should be -rings-
Column 6, line 37 "screw" should be -screws-
```

Signed and Sealed this

Twenty-sixth Day of July, 1988

Attest:

DONALD J. QUIGG

*Attesting Officer*      *Commissioner of Patents and Trademarks*